United States Patent
Levanoni et al.

(10) Patent No.: US 8,539,465 B2
(45) Date of Patent: Sep. 17, 2013

(54) ACCELERATING UNBOUNDED MEMORY TRANSACTIONS USING NESTED CACHE RESIDENT TRANSACTIONS

(75) Inventors: Yosseff Levanoni, Redmond, WA (US); Gad Sheaffer, Haifa (IL); Ali-Reza Adl-Tabatabai, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 856 days.

(21) Appl. No.: 12/638,103

(22) Filed: Dec. 15, 2009

(65) Prior Publication Data

US 2011/0145802 A1  Jun. 16, 2011

(51) Int. Cl.
*G06F 9/45* (2006.01)

(52) U.S. Cl.
USPC .......................................................... 717/151

(58) Field of Classification Search
USPC .................................. 717/127–128, 151–161
See application file for complete search history.

(56) References Cited

U.S. PATENT DOCUMENTS

| | | |
|---|---|---|
| 4,442,487 A | 4/1984 | Fletcher |
| 5,394,555 A | 2/1995 | Hunter |
| 5,404,555 A | 4/1995 | Liu |
| 5,428,761 A | 6/1995 | Herlihy et al. |
| 5,768,500 A | 6/1998 | Agrawal |
| 5,835,764 A | 11/1998 | Platt |
| 6,314,563 B1 | 11/2001 | Agensen |
| 6,665,704 B1 | 12/2003 | Singh |
| 6,751,617 B1 | 6/2004 | Anfindsen |
| 6,842,830 B2 | 1/2005 | Khare |
| 6,845,430 B2 | 1/2005 | Hopeman |
| 6,862,635 B1 | 3/2005 | Alverson |
| 6,871,264 B2 | 3/2005 | Soltis |
| 6,898,609 B2 | 5/2005 | Kerwin |
| 6,938,128 B1 | 8/2005 | Kuskin et al. |
| 6,976,155 B2 | 12/2005 | Drysdale |
| 7,111,294 B2 | 9/2006 | Steensgaard |
| 7,127,561 B2 | 10/2006 | Hill |
| 7,162,512 B1 | 1/2007 | Amit |
| 7,181,578 B1 | 2/2007 | Guha |
| 7,210,145 B2 | 4/2007 | Srinivasan |
| 7,213,106 B1 | 5/2007 | Koster |
| 7,246,123 B2 | 7/2007 | Carr |
| 7,284,091 B2 | 10/2007 | Chow et al. |
| 7,320,065 B2 | 1/2008 | Gosior |
| 7,343,476 B2 | 3/2008 | Floyd et al. |
| 7,376,800 B1 | 5/2008 | Choquette |
| 7,395,382 B1 | 7/2008 | Moir |
| 7,406,698 B2 | 7/2008 | Richardson |

(Continued)

OTHER PUBLICATIONS

Harris et al., "Abstract Nested transactions", 2007, CiteSeerX, http://citeseerx.ist.psu.edu/viewdoc/summary?doi=10.1.1.126.3885, pp. 1-10.*

(Continued)

*Primary Examiner* — Ted T Vo
(74) *Attorney, Agent, or Firm* — Workman Nydegger (57) ABSTRACT

Using cache resident transaction hardware to accelerate a software transactional memory system. The method includes identifying a plurality of atomic operations intended to be performed by a software transactional memory system as transactional operations as part of a software transaction. The method further includes selecting at least a portion of the plurality of atomic operations. The method further includes attempting to perform the portion of the plurality of atomic operations as hardware transactions using cache resident transaction hardware.

20 Claims, 3 Drawing Sheets

(56) References Cited

U.S. PATENT DOCUMENTS

| | | | |
|---|---|---|---|
| 7,467,323 | B2 | 12/2008 | Fields |
| 7,478,210 | B2 | 1/2009 | Saha |
| 7,502,897 | B2 | 3/2009 | Hertzberg |
| 7,512,636 | B2 | 3/2009 | Verma |
| 7,516,366 | B2 | 4/2009 | Lev |
| 7,584,232 | B2 | 9/2009 | Guo |
| 7,711,909 | B1 | 5/2010 | Lev et al. |
| 7,856,537 | B2 | 12/2010 | Kumar |
| 7,860,847 | B2 | 12/2010 | Detlefs et al. |
| 8,095,824 | B2 | 1/2012 | Gray |
| 8,229,907 | B2 | 7/2012 | Gray |
| 2003/0055807 | A1 | 3/2003 | Lomet |
| 2003/0145136 | A1 | 7/2003 | Tierney et al. |
| 2003/0188300 | A1 | 10/2003 | Patrudu |
| 2004/0243868 | A1 | 12/2004 | Toll et al. |
| 2005/0060495 | A1 | 3/2005 | Pistoulet |
| 2005/0246487 | A1 | 11/2005 | Ergan |
| 2006/0085591 | A1 | 4/2006 | Kumar |
| 2007/0143287 | A1 | 6/2007 | Adi-Tabatabai |
| 2007/0143741 | A1 | 6/2007 | Harris |
| 2007/0156780 | A1 | 7/2007 | Saha |
| 2007/0156994 | A1 | 7/2007 | Akkary |
| 2007/0186056 | A1 | 8/2007 | Saha et al. |
| 2007/0198792 | A1 | 8/2007 | Dice |
| 2007/0198979 | A1 | 8/2007 | Dice |
| 2007/0239943 | A1 | 10/2007 | Dice |
| 2007/0245099 | A1 | 10/2007 | Gray |
| 2007/0245128 | A1 | 10/2007 | Gray |
| 2007/0260608 | A1 | 11/2007 | Hertzberg |
| 2007/0260942 | A1 | 11/2007 | Rajwar |
| 2008/0021934 | A1 | 1/2008 | Hudson |
| 2008/0040551 | A1 | 2/2008 | Gray |
| 2008/0127035 | A1 | 5/2008 | Lev |
| 2008/0162886 | A1 | 7/2008 | Saha |
| 2008/0163220 | A1 | 7/2008 | Wang |
| 2008/0270745 | A1 | 10/2008 | Saha |
| 2009/0006407 | A1 | 1/2009 | Magruder |
| 2009/0006467 | A1 | 1/2009 | Visscher |
| 2009/0006751 | A1 | 1/2009 | Taillefer |
| 2009/0006767 | A1 | 1/2009 | Saha |
| 2009/0007119 | A1 | 1/2009 | Blumrich |
| 2009/0019231 | A1 | 1/2009 | Cypher |
| 2009/0063780 | A1 | 3/2009 | Terechko |
| 2009/0070774 | A1 | 3/2009 | Raikin et al. |
| 2009/0089520 | A1 | 4/2009 | Saha |
| 2009/0113443 | A1 | 4/2009 | Heller |
| 2009/0165006 | A1 | 6/2009 | Ceze |
| 2009/0172292 | A1 | 7/2009 | Saha |
| 2009/0172303 | A1 | 7/2009 | Welc et al. |
| 2009/0172305 | A1 | 7/2009 | Shpeisman |
| 2009/0172306 | A1 | 7/2009 | Nussbaum |
| 2009/0172654 | A1 | 7/2009 | Zhao |
| 2009/0182956 | A1 | 7/2009 | Caprioli et al. |
| 2009/0204969 | A1 | 8/2009 | Abadi |
| 2009/0235237 | A1 | 9/2009 | Yonghong |
| 2009/0235262 | A1 | 9/2009 | Ceze et al. |
| 2009/0260011 | A1 | 10/2009 | Snover |
| 2009/0282386 | A1 | 11/2009 | Moir et al. |
| 2010/0131953 | A1 | 5/2010 | Dice |
| 2010/0138841 | A1 | 6/2010 | Dice et al. |
| 2010/0162249 | A1 | 6/2010 | Shpeisman |
| 2010/0169382 | A1 | 7/2010 | Sheaffer |
| 2010/0169579 | A1 | 7/2010 | Sheaffer |
| 2010/0169580 | A1 | 7/2010 | Sheaffer |
| 2010/0229043 | A1 | 9/2010 | Saha |
| 2010/0325630 | A1 | 12/2010 | Flood |
| 2010/0332538 | A1 | 12/2010 | Gray |
| 2010/0332716 | A1 | 12/2010 | Sheaffer |
| 2010/0332721 | A1 | 12/2010 | Yamada |
| 2010/0332753 | A1 | 12/2010 | Gray |
| 2010/0332768 | A1 | 12/2010 | Gray |
| 2010/0332771 | A1 | 12/2010 | Gray |
| 2010/0332807 | A1 | 12/2010 | Sheaffer |
| 2010/0332808 | A1 | 12/2010 | Adl-Tabatabai |
| 2011/0145304 | A1 | 6/2011 | Gray |
| 2011/0145498 | A1 | 6/2011 | Taillefer |
| 2011/0145553 | A1 | 6/2011 | Levanoni |
| 2012/0179877 | A1 | 7/2012 | Shriraman et al. |
| 2012/0284485 | A1 | 11/2012 | Yamada |

OTHER PUBLICATIONS

Ananian; "Unbounded Transactional Memory"; 2009; pp. 1-12; http://supertech.csail.mit.edu/papers/xaction.ps.

Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.

Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.

Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.

Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.

Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.

Moravan; "Supporting Nested Transactional Memory in LogTM"; Oct. 21-25, 2006; pp. 1- 12; http://www.cs.wisc.edu/multifacet/papers/asplos06_nested_logtm.pdf.

Carlstrom; "The ATOMOΣ Transactional Programming Language"; Jun. 11-16, 2006; pp. 1-13; http://tcc.stanford.edu/publications/tcc_pldi2006.pdf.

Moss; "Open Nested Transactions"; Semantics and Support; 2006; pp. 1-8; http://www.cs.utah.edu/wmpi/2006/final-version/wmpi-posters-1-Moss.pdf.

Minh; "An Effective Hybrid Transactional Memory System with Strong Isolation Guarantees"; Jun. 9-13, 2007; pp. 1-12; http://tcc.stanford.edu/publications/tcc_isca2007.pdf.

Chong; "Scalable HMM based Inference Engine in LVCSR"; Mar. 31, 2009; 1 page; http://www.icsi.berkeley.edu/cgi-bin/events/event.pl?ID=000531.

Zeichick; "Massive Multi-Core Processors: The Gamer's Edge"; Oct. 4, 2007; pp. 1-2; http://developer.amd.com/documentation/articles/Pages/1042007177.aspx.

Vasantharam; "CSMP"; 2009; pp. 1-3; http://sourceforge.net/projects/mupisoft/.

Bracy; "Disintermediated Active Communication"—Nov. 9, 2006—pp. 1-4—http://ieeexplore.ieee.org/stamp/stamp.jsp?arnumber=04069172.

Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.

Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.

Lilja; "Cache Coherence in Large-Scale Shared Memory Multiprocessors: Issues and Comparisons"—Sep. 1993—pp. 1-43—http://www.arctic.umn.edu/papers/coherence-survey.pdf.

Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.

Papamarcos; "A Low-Overhead Coherence Solution for Multiprocessors with Private Cache Memories"—1984—pp. 348-354—http://www.csl.cornell.edu/courses/ece572/papamarcos.isca84.pdf.

Chuang; "Unbounded Page-Based Transactional Memory"—Oct. 21-25, 2006—pp. 1-12—http://www.cse.ucsd.edu/~wchuang/ASPLOS-06-PTM.pdf.

Swift; "OS Support for Virtualizing Hardware Transactional Memory"—2008—pp. 1-10—http://www.cs.wisc.edu/multifacet/papers/transact08_tvm.pdf.

Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.
Andrew; "A Dictionary of HTML META Tags"—Feb. 11, 2007—pp. 1-11—http://vancouver-webpages.com/META/metatags.detail.html.
Spear; "Implementing and Exploiting Inevitability in Software Transactional Memory"—2008—pp. 59-66—http://ieeexplore.ieee.org/stamp/stamp.jsp?arnumber=04625833.
Author Unknown; Wikipedia; "Software Transactional Memory"—May 7, 2009—pp. 1-7—http://en.wikipedia.org/wiki/Software_transactional_memory.
Zilles et al. "Extending Hardware Transactional Memory to Support Non-busy Waiting and Non-transactional Actions," Nov. 2006, pp. 1-10.
Joao; "Flexible Reference-Counting-Based Hardware Acceleration for Garbage Collection"—Published Jun. 20-24, 2009 pp. 1-11.
Grossman; "The Transactional Memory/Garbage Collection Analogy"—Published Oct. 21-25, 2007—pp. 1-12.
Adl-Tabatabai; "Unlocking Concurrency"—Published Dec./Jan. 2006-2007 pp. 25-33.
Carlstrom; "Executing Java Programs with Transactional Memory"—Published Mar. 26, 2007 pp. 1-32.
Volos - "NePalTM: Design and Implementation of Nested Parallelism for Transactional Memory"—Published 2009, pp. 1-25.
Rothermel—"Concurrency Control Issues in Nested Transactions"—Published 1992, pp. 1-36.
Author Unknown—".NET Framework 4 Beta 1 enabled to use Software Transactional Memory (STM.NET Version 1.0)"—Published Jul. 24, 2009; pp. 1-84.
Nyte—"Nesting Models in Software Transactional Memory"—Published Sep. 14, 2007; pp. 1-3.
Agrawal—"Nested parallelism in transactional memory"—Published 2008; pp. 163-174.
Bobba—"Performance Pathologies in Hardware Transactional Memory"—Published 2007; pp. 1-11.
Author Unknown—"Hw-breakpoint: shared debugging registers"—Published Sep. 16, 2009; pp. 1-3.
Scherer—"Contention Management in Dynamic Software Transactional Memory"—Published Apr. 2004; pp. 1-10.
Curnow—"An Embedded Processor Architecture with Extensive Support for SoC Debug"—Retrieved Jun. 11, 2010; pp. 1-5.
U.S. Appl. No. 12/495,582, mailed Oct. 4, 2011, Office Action.
U.S. Appl. No. 12/493,163, mailed Nov. 28, 2011, Notice of Allowance.
U.S. Appl. No. 12/493,165, mailed Dec. 12, 2011, Office Action.
U.S. Appl. No. 12/493,167, mailed Jan. 20, 2012, Office Action.
U.S. Appl. No. 12/493,164, mailed Feb. 3, 2012, Office Action.

Notice of Allowance dated Feb. 21, 2012 cited in U.S. Appl. No. 12/493,161.
Notice of Allowance dated Mar. 14, 2012 cited in U.S. Appl. No. 12/495,582.
Office Action dated Mar. 29, 2012 cited in U.S. Appl. No. 12/493,168.
Office Action dated Mar. 16, 2012 cited in U.S. Appl. No. 12/493,162.
Notice of Allowance dated Apr. 9, 2012 cited in U.S. Appl. No. 12/493,161.
Office Action dated Apr. 4, 2012 cited in U.S. Appl. No. 12/638,929.
Shriraman—"Hardware Acceleration of Software Transactional Memory"—Published 2006—http://www.cs.rochester.edu/u/scott/papers/2006_TRANSACT_RTM.pdf—pp. 1-10.
Diestelhorst—"Hardware acceleration for lock-free data structures and software-transactional memory"—Published Aug. 14, 2008—http://www.amd64.org/fileadmin/user_upload/pub/epham08-asf-eval.pdf—pp. 1-8.
Harizopoulos—"Steps towards cache-resident transaction processing"—Published 2004—http://www.eecg.toronto.edu/~amza/ece1747h/papers/steps.pdf—pp. 1-12.
Lie—"Hardware Support for Unbounded Transactional Memory"—Published May 7, 2004—http://slie.ca/projects/transmem/thesis-sean_lie.pdf—pp. 1-111.
Saha—"Architectural Support for Software Transactional Memory"—Published 2006—http://ieeexplore.ieee.org/stamp/stamp.jsp?tp=&arnumber=4041846—pp. 1-12.
Office Action dated Aug. 20, 2012 cited in U.S. Appl. No. 12/638,929.
Office Action dated Aug. 16, 2012 cited in U.S. Appl. No. 12/493,164.
Notice of Allowance dated Sep. 13, 2012 cited in U.S. Appl. No. 12/493,168.
Notice of Allowance dated Sep. 24, 2012 cited in U.S. Appl. No. 12/493,165.
Office Action dated Oct. 5, 2012 cited in U.S. Appl. No. 12/493,167.
Office Action dated Oct. 24, 2012 cited in U.S. Appl. No. 12/493,162.
Notice of Allowance dated Mar. 20, 2013 cited in U.S. Appl. No. 12/493,167.
Notice of Allowance dated Nov. 29, 2012 cited in U.S. Appl. No. 12/638,929.
U.S. Appl. No. 13/845,467, filed Mar. 18, 2013, Gray.
U.S. Appl. No. 13/544,558, mailed May 1, 2013, Office Action.
Office Action dated Jan. 4, 2013 cited in U.S. Appl. No. 12/638,214.
Notice of Allowance dated May 31, 2013 cited in U.S. Appl. No. 12/638,214.
Office Action dated Jul. 17, 2013 cited in U.S. Appl. No. 12/638,345.

* cited by examiner

ACCELERATING UNBOUNDED MEMORY TRANSACTIONS USING NESTED CACHE RESIDENT TRANSACTIONS

BACKGROUND

Background and Relevant Art

Computers and computing systems have affected nearly every aspect of modern living. Computers are generally involved in work, recreation, healthcare, transportation, entertainment, household management, etc.

Often computing system implement transactional operations where for a given set of operations, either all of the operations should be performed or none of the operations are performed. The set of operations that should all be performed or not performed may sometimes be referred to as an atomic block of operations. For example, a banking system may have operations for crediting and debiting accounts. When operations are performed to exchange money from one account to another, serious problems can occur if the system is allowed to credit one account without debiting another account. However, transactional computing maintains historical information such that operations can be rolled back if all operations in an atomic set of operations cannot be performed. If all of the operations in the atomic set of operations have been performed, then any changes to data stored in memory are committed and become globally available to other actors for reading or for further operations. Transactional computing can be implemented, in some systems, using specialized hardware that supports transactional memory. In systems where hardware does not support hardware based transaction computing, transactional computing can be performed by using software techniques.

Additionally, hardware based systems are more limited in the size of transactions that can be accomplished using the hardware. In particular, hardware based systems may use a level 1 data cache (L1D$) to buffer values for a transaction. The L1D$ is limited in size and as such, limits the size of transactions that can be performed using hardware based transactional memory. If a transaction requirements exceeds the size of the L1D$, then the transaction will abort and may not be able to be performed using the hardware based system.

In implementations of unbounded software transactional memory, atomic operations are frequently used to acquire and release fine-grained locks known as TMW's (transactional memory words). The TMW's are generally manipulated in various ways.

For example, write locks prevent other transactions from modifying an object. They also ensure that transactions that have read dependency on the data get doomed in case the data is modified by another transaction. In some examples, acquiring an exclusive write lock toggles a bit in the TMW to signal that the object is now owned by a particular transaction. Write lock acquisition can either happen as the user code executes (encounter time locking) or when the transaction wishes to commit (commit time locking). Similarly, releasing a write lock includes resetting the write bit in the TMW. Under some arrangements, this is done using an atomic operation as well.

In another example, pessimistic read locks prevent other transactions from modifying data. However, they allow multiple concurrent readers. In some examples, acquiring a pessimistic lock increments a pessimistic reader count maintained within the TMW. An alternative arrangement links a "Pessimistic Read Entry" into a circular linked list rooted at the TMW, such that the readers are visible. A pessimistic read lock can be acquired as the program executes (encounter time locking). A pessimistic read lock can also be acquired as part of pessimization, which is a process during which all the optimistic read locks are converted into pessimistic read locks. Pessimistic read locks are released when the transaction completes.

In yet another example, the TMW may have a bit reserved to note that a thread is waiting for the object to be changed. This allows a transaction that modifies the object to efficiently detect when it needs to wake up waiters. The waiter bit is set for all objects in a transaction's read set when the transaction is about to enter a wait for retry.

Each of the preceding manipulations of the TMW typically requires the use of atomic operations, such as atomic compare and swap operations. Atomic operations are currently quite expensive as they require a round-trip to the bus. On current hardware, interlocked operations are on the order of 20 to 40 cycles when no contention is present. The accumulative price of these operations represents a significant cost in the implementation of software transactional memory (STM) systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment and includes acts for using cache resident transaction hardware to accelerate a software transactional memory system. The method includes identifying a plurality of atomic operations intended to be performed by a software transactional memory system as transactional operations as part of a software transaction. The method further includes selecting at least a portion of the plurality of atomic operations. The method further includes attempting to perform the portion of the plurality of atomic operations as hardware transactions using cache resident transaction hardware.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include functionality to significantly reduce the cost associated with the interlocked operations by grouping them into cache resident transactions. Cache resident transactions have a small per cost operations and only a significant cost on entry and exit. Thus, if enough operations could be batched, the amortized cost per operation can be lowered.

As explained above, there are broadly two categories of atomic operations: those that happen at encounter time and those that happen at commit time or during pessimization. The latter are generally under the total control of the system and therefore the system has total control over how to split these operations between hardware transactions and how to react to failure. Applying hardware transactions to accelerate these portions of a software transactional memory (STM) system may include an application of a multi-word compare and swap primitive (MCAS), which can be easily implemented using one or more transactional hardware mechanisms.

Unlike operations that are totally under system control, the invocations of encounter-time locking primitives are interspersed within user code and thus there is no natural place to control the size and error handling of failure of hardware transactions that could be injected. Hardware transactions can be applied to accelerate encounter time locking when the hardware offers explicit hardware transactions and when the hardware offers implicit hardware transactions.

Embodiments may take advantage of two distinct forms of hardware acceleration: implicit and explicit cache resident (CR) transactions.

Figure 1A:
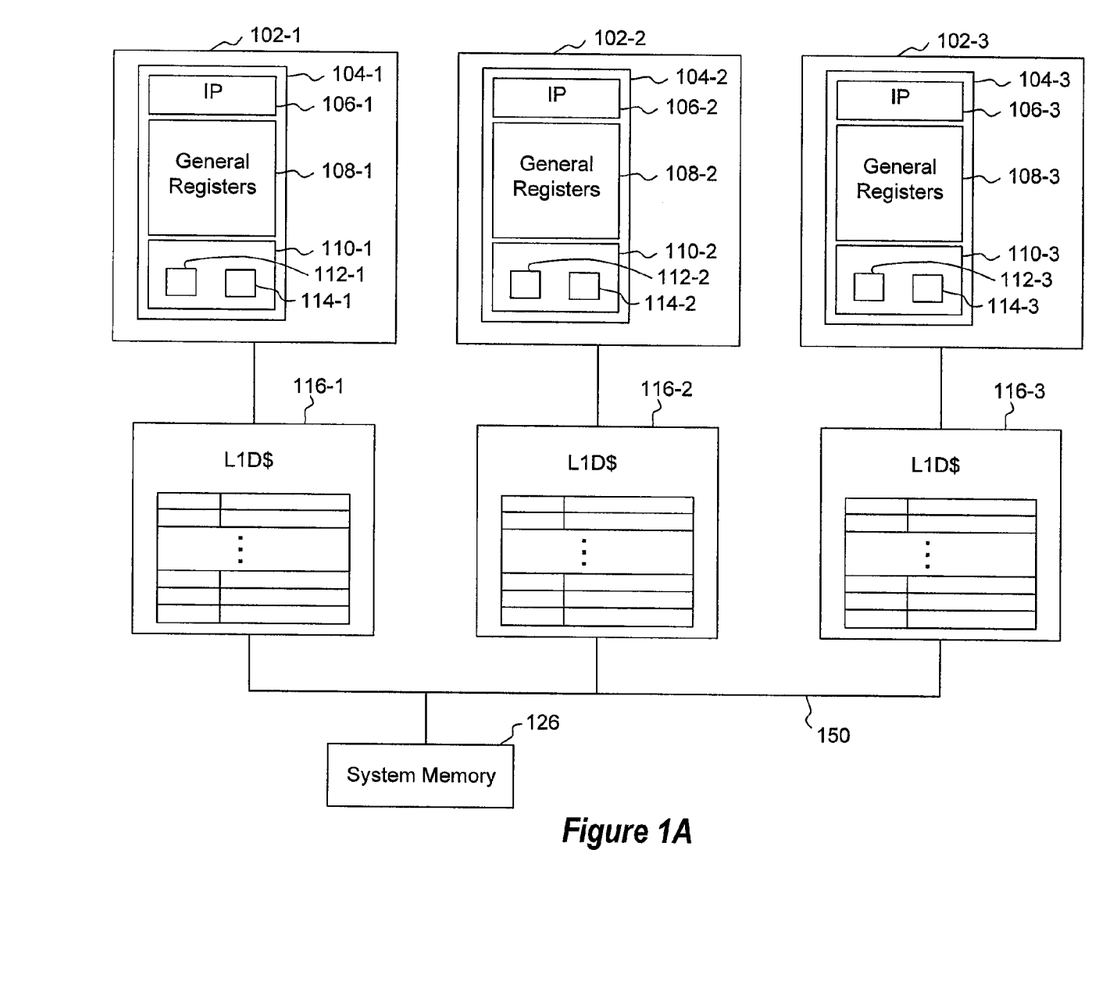
FIG. 1A illustrates a cache hierarchy.

In implicit transactions, the hardware is instructed by software to start executing a transaction and at that point all reads are implicitly monitored and all writes are implicitly buffered, as will be described in more detail below in conjunction with the description of FIGS. 1A and 1B. When the software wishes to commit the transaction it issues another instruction to tell the hardware to do so. Thus, implicit CR transactions can encompass, in general, arbitrary code and all its operations will be automatically isolated by the hardware. In case the hardware detects a conflict, it undoes all of uncommitted side effects of the transaction, except perhaps for the restoration of some architectural state, and transfers control to a location specified by the software, where the software can choose how to react to the failure. With respect to thread-local memory, such as the thread stack, all side effects are undone and the execution environment is restored upon transaction rollback, except for prescribed architectural state that is potentially not restored and potentially some architectural state that conveys to the application the approximated reason for failure (e.g., cache capacity vs. conflict from another bus agent).

With explicit transactions, on the other hand, the software explicitly issues special memory access instructions that are explicitly monitored and or buffered. In case the hardware transaction fails, it is typically the case that explicit transactions do not automatically transfer control to a specified location. Instead, the software occasionally probes the state of the transaction and reacts explicitly to the case where the transaction has been aborted.

With an explicit transaction, if the transaction gets aborted while the software has not yet probed for failure, the buffered writes are lost and monitoring on read locations is lost as well. Thus explicit transactions may observe inconsistent data in the duration between transaction rollback and their probing of transaction state.

Embodiments may take advantage of either form of CR transactions in the acceleration of STM.

Hardware transactional memory solutions may be implemented using cache memory. Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. However, embodiments may be implemented where processors support multiple threads. Each of the threads 104-1-104-3 includes an instruction pointer 106-1-106-3, general registers 108-1-108-3, and special registers 110-1-110-3. Each of the special registers 110-1-110-3 includes a transaction control register (TCR) 112-1-112-3 and a transaction status register (TSR) 114-1-114-3. The functionality of these registers will be explained in more detail below in conjunction with the description of FIG. 1B.

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120. The tag column 118 typically includes an address column 122 and a MESI column 124. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache-coherent multiprocessor, a level of data cache that is logically private to one processor (usually level one data cache (L1D$)) may be extended with additional MESI states and behavior to provide cache coherence based detection of conflicting data accesses from other agents, and to locally buffer speculative writes in a private cache such that other agents in the system do not observe speculatively written data until the data's state transitions from speculatively written to globally observed.

The address column 122 includes a physical address for data stored in the data column 120. In particular, as illustrated in FIG. 1A, a computing system generally includes system memory 126. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture.

Figure 1B:
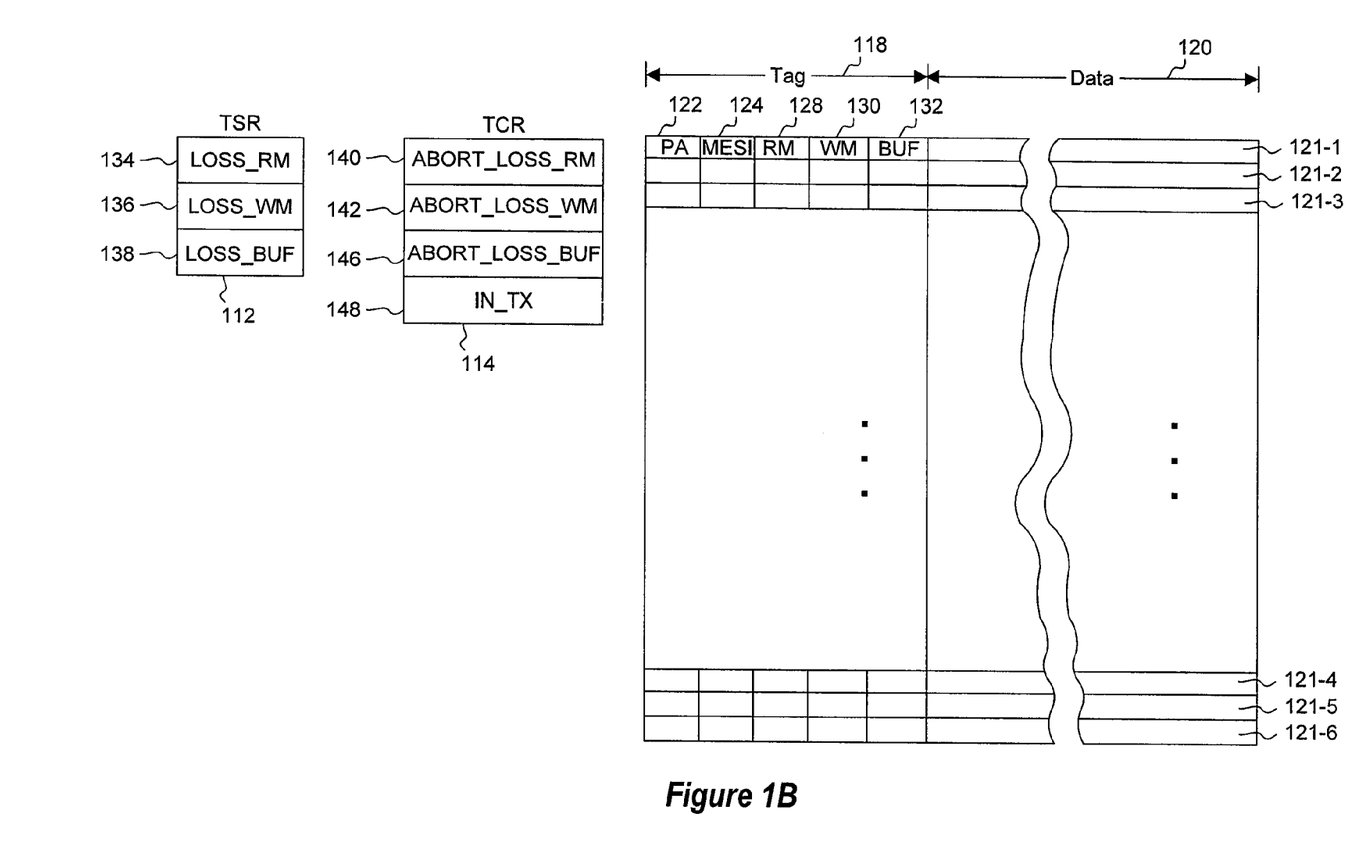
FIG. 1B illustrates details of a data cache with monitoring enabled.

FIG. 1B further illustrates details of the transaction status register 112 included in the hardware threads 104. The transaction status register 112 accumulates events related to the read monitor indicator, the write-monitor indicator, and the buffer monitor indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

The following now illustrates a number of concrete examples.

STM Log Processing

In some STM systems, reads and writes are recorded in a log. The log is processed at the end of the transaction to ensure that there are no conflicting reads or writes. One embodiment includes functionality of acceleration of log processing of an STM. The following illustrates a number of write locks operations that may be recorded in the log: Commit-time write lock acquisition for each object logged in the transaction's write log; Commit-time or rollback-time write lock release for each object for which a write lock has been previously acquired; Commit time pessimistic read lock acquisition for each object logged in the transaction's read log; Commit-time or rollback-time pessimistic read lock release for each object for which a pessimistic read lock has been previously acquired; Acquisition of pessimistic read locks during transaction pessimization for each object logged in the transaction's read log; and Setting waiter bits in the objects the transaction has read so far when entering a wait for retry.

For each of these log processing activities, processing can be performed by processing the log in batches of N entries. Initially, attempts are made to process the batch using a cache resident transaction. However if processing with a cache resident transaction fails, processing can fall back to using normal software based interlocked operations to process the log.

Details are now illustrated showing processing of the batch under a cache resident transaction. If implicit transactions are available, atomic operations are replaced with implicitly monitored and buffered reads and writes. For example, a transaction system with hardware support may be put into a hardware transaction mode where all reads are monitored and all writes are buffered. Alternatively, if explicit transactions are available, atomic operations are replaced with explicitly monitored reads and buffered writes. For example, if a MOV instruction represents a non-monitored load or a non-buffered store, the instruction set architecture of a processor may include a MOVX instruction that is similar to a MOV instruction except that reads explicitly monitored and writes are explicitly buffered. In either implicit or explicit modes, if no conflict or resource lack is reported, the transaction is committed. Otherwise, the cache resident transaction is rolled back and operations fallback to processing the batch using normal interlocked operations.

Illustrating advantages of the preceding, a few definitions will now be introduced. N: number of operations in a batch; I: average cost of a non-contended interlocked operation; M: average cost of a successfully monitored and/or buffered operation in a cache resident (i.e. hardware) implicit transaction; T: average cost of initiating and committing a cache resident transaction (including necessary memory barriers). Acceleration can be achieved as soon as N is big enough such that: $N*I > T + N*M$. Or in other words: $N > T/(I-M)$ Illustrating now a concrete example, substituting T=200 cycles, I=20 cycles and M=2, N~>10.

A down-side to increasing N is that systems could exceed the capacity of the cache. In particular, cache resident transactions are typically limited by the size of the cache. Only a given number of writes can be made before a cache entry must be recycled, resulting in monitoring or buffering loss and causing the hardware transaction to abort. However, this can be generally avoided statically by an appropriate selection of N.

Another down side may be that work is wasted when a transaction rolls back due to conflict. This should be rather rare and again, acceleration can be achieved with even modest values for N (e.g., N=20) such that this event would be even rarer. In the worst case for log processing applications, this just means that the batch needs to be re-processed. Nothing happens to the SW transaction as a whole.

Acceleration of Encounter Time Locking Using Explicit Transactions

An embodiment is now illustrated including the option where nested cache resident transactions are not introduced by the compiler into the generated code. This embodiment maintains the invariant that the SW transaction at any given moment has a nested CR transaction that is dynamically introduced. The very first CR transaction is created when the SW transaction begins. Whenever the SW transaction wants to acquire a pessimistic lock, it issues an explicitly monitored and buffered write to the TMW and increments a counter. If, when opening a lock, the counter crosses a threshold batch size value, the HW transaction is committed and the software transaction immediately starts a new dynamically nested explicit CR transaction. In addition, the last active CR transaction is committed when the SW transaction commits.

Detection of CR transaction failure happens when it is committed. If monitoring or buffering is lost, the entire software transaction is doomed because it may have been executing based on an inconsistent state and there is no way to revert back to the point where the HW transaction was initiated (because it was dynamically introduced and the stack may have already been unwound).

Thus, if any CR transaction is aborted, embodiments abort the entire software transaction. For this reason, a smaller number of N (the batch factor) is used in this application of the mechanism. After a few times on unsuccessfully trying to execute the software transaction in this batching mode, the transaction reverts back to using interlocked operations, to ensure forward progress. Reducing N may be performed in some embodiments in an exponential fashion on each try. This helps to reduce N more quickly as needed to a number that will allow the acceleration. In particular, in one embodiment, the compiler may reduce N exponentially, but raise N linearly. Notably, the increase of N linearly may be up to some predetermined value. In other words, N may be potentially capped at some value.

Embodiments may eliminate a problem introduced by dynamically starting the CR transactions by statically placing their boundaries in the code by the compiler. In this arrangement, the compiler would develop a static or feedback based model for the weight of each section of code, and transitively for methods. The compiler would then be responsible for introducing explicit (non-user visible) cache-resident transactions at positions where they would be big enough to warrant the benefits of batching, but not too big, so that conflicts and overflows are likely.

If the CR transaction fails at runtime, embodiments could revert back to the point it started (introduced by the compiler) and embodiments could either re-execute it in hardware (e.g. if failure was due to conflict and a number of retries have not already been attempted) or re-execute it in software (e.g. if there is an overflow of the cache or if numerous retry attempts have already been made).

For example consider the following function:

```
Void Foo( )
{
    Stmt1;
    Stmt2;
    Stmt3;
    Stmt4;
    Stmt5;
    Stmt6;
}
```

Suppose that the compiler decided that it makes sense to execute the first three statements in one batch, and the last three in a separate batch. The code generated by the compiler for the first batch would then become:

```
If (tx->CRTxAlreadyInProgress)
{
    ExCR_Stmt1;
    ExCR _Stmt2;
    ExCR _Stmt3;
}
else {
    int retyCount = 0;
    bool success = false
    while (retryCount < MAX_RETRY) {
        Tx-> CRTxAlreadyInProgress = TRUE;
        try
        {
            Begin Explicit Hardware Transaction
            ExCR_Stmt1;
            ExCR _Stmt2;
            ExCR _Stmt3;
            Commit Explicit Hardware Transaction;
            // assume this throws
if unsuccessful
            success = true;
            break;
        }
        catch
        {
            Cleanup Explicit Hardware Transaction;
        }
    }
    Tx-> CRTxAlreadyInProgress = FALSE;
    If (!success) {
        // Hardware acceleration failed, execute in
        software now
        STM_Stmt1;
        STM_Stmt2;
        STM_Stmt3;
    }
}
```

ExCR_Stmt stands for the transformation of Stmt to explicit CR transactions which are also software lock respecting. Specifically reads of transactional locks are done using explicitly monitored reads and writes into transactional locks are performed using explicitly buffered writes. Reads of program data can be done normally (without monitoring), as the reads are protected using the monitoring on the respective transactional locks. Writes of program data are buffered into shadow copies inasmuch as the buffering needs to extend beyond the point of commit of the CR transaction. In-place writes may not be used as the software lock acquisition is done with CR buffered writes and as such it is completely ephemeral. In an in-place update system, writes which have been buffered into shadow copies whilst executing the CR transaction may be copied to their destination, after the CR commits, since the committal of the CR transaction makes the acquisition of software locks permanent. In addition, compatible versions of functions are called.

STM_Stmt similarly stands for the transformation of Stmt to pure software transactions. Specifically each read and write access is performed using software STM barriers and in addition compatible versions of functions are called.

Note that this transformation allows Foo to be called within a CR transaction. In the case that this happens, the operations within Foo are simply inlined within that ambient CR transaction. On the other hand if no hardware transaction exists at the point of entry into a batch, then a new transaction is created.

Acceleration of Encounter Time Locking Using Implicit Transactions

As illustrated above leveraging explicit transactions entailed either aborting the entire software transaction in case of CR transaction failure or otherwise introducing CR transaction boundaries by the compiler. Using implicit transactions, on the other hand, allows avoiding these complexities since implicit hardware transactions, when they fail, leave the thread in practically the same state as it was at when the CR transaction started. Thus it is possible to inject implicit hardware transactions at arbitrary execution points and still be able to rollback to that arbitrary point instead of being forced to abort the entire software transaction.

Similar to explicit CR transaction embodiments again maintain the invariant that the SW transaction at any given moment has a nested CR transaction that is dynamically introduced. The very first CR transaction is created when the SW transaction begins. Whenever the SW transaction wants to acquire a pessimistic lock, it issues an implicitly monitored and buffered write to the TMW and increments a counter. If, when acquiring a lock, the counter crosses a threshold batch size value, the HW transaction is committed and the software transaction immediately starts a new dynamically nested implicit CR transaction. In addition, the last active CR transaction is committed when the SW transaction commits. Reads and writes to object data are handled similarly to the way they are handled with explicit CR transaction as illustrated above. In particular, reads of program data do not have to be monitored (but may be monitored) and writes of program data are written to a software-maintained shadow copy at-least until software lock acquisition becomes permanent with the committal of the CR transaction, Upon implicit CR transaction failure control is transferred to a point established by the last dynamically introduced implicit CR transaction and all thread-local state is restored, including the thread's stack. For example, consider an implicit hardware CR transaction system that reports through a rtxsuccess register whether control has reached a point following a start_tx due to rollback or as part of transaction execution. e.g.,

```
start_tx; // sets rtxsuccess to 0 on rollback, 1 on normal execution
test rtxsuccess;
jump_if_zero TxRollback;
TxBody: // transaction body comes here...
...
TxRollback: // On rollback we end up here...
```

This hardware primitives can readily be packaged in C library routines such as:

```
bool TxStart( )
* returns true on normal entry to transaction body
* returns false on rollback path
void TxCommit( )
* tries to commit the transaction
* if not successful, results in a jump to the rollback
branch of the corresponding
TxStart( )
```

Given these thin wrappers over the hardware primitives embodiments can formulate encounter time lock acquisition in the following terms

```
AcquireLock(TMW * pTmw)
{
    // Do the read and write operations required to change the lock state.
    // Issue these as normal (implicitly monitored and buffered) reads
    and writes
    // e.g.
    pTmw->m_owner = tx;
    tx->batched_locks++;
    if (tx->batched_locks >= tx->max_locks_to_batch)
    {
        TxCommit( ); // If unsuccessful, will revert to TxStart below
    with success==FALSE
        // If we have been successful, perhaps we can be more
    aggressive about the number of lock
        // acquisitions we can batch, up to a certain hard limit.
        if (tx->max_locks_to_batch <
    ABSOLUTE_MAX_LOCKS_TO_BATCH)
            tx->max_locks_to_batch++;
    TryToStart:
        tx->batched_locks = 0;
        bool success = TxStart( ); // Start a new one
        if (!success) {
            // Rollback path. Apply fallback logic here. e.g.:
            // 1) Acquire lock using interlocked operations AND/OR
            // 2) Decrease the size of max_locks_to_batch
            // This code illustrates using the second option
                tx->max_locks_to_batch /= 2;
                goto TryToStart;
        }
    }
}
```

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
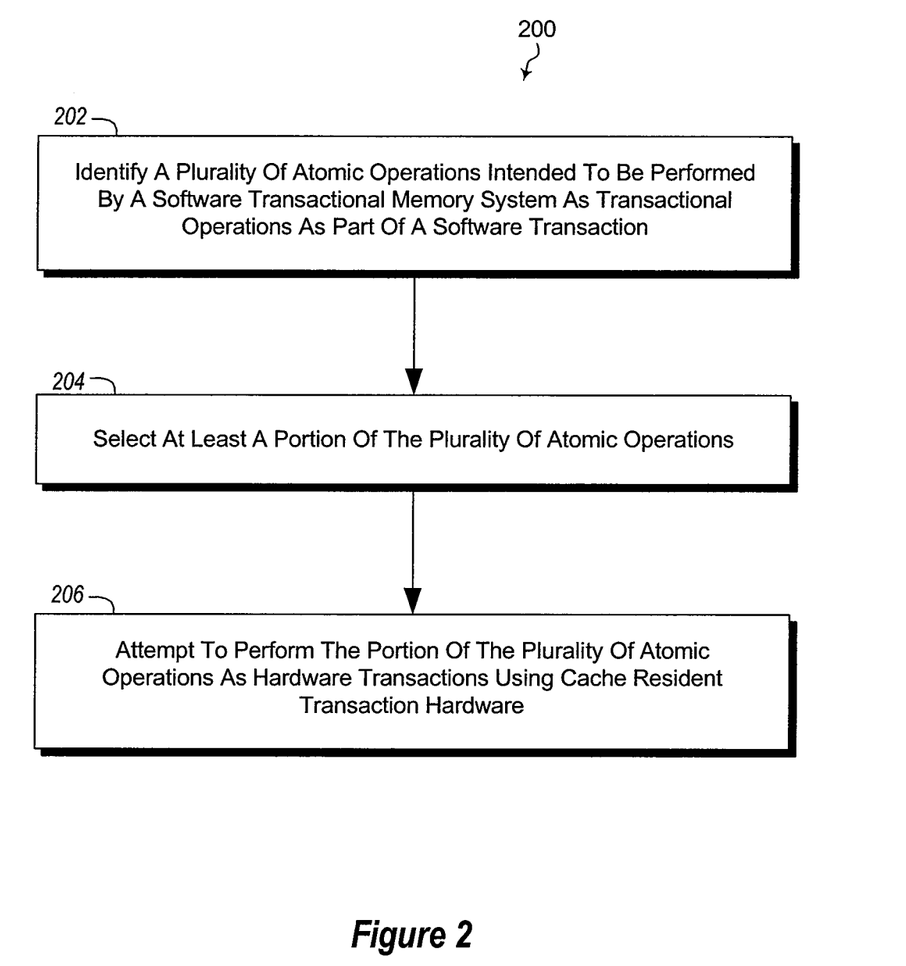
FIG. 2 illustrates a method of using cache resident transaction hardware to accelerate a software transactional memory system.

Referring now to FIG. 2, a method 200 is illustrated. The method may be practiced in a computing environment and includes acts for using cache resident transaction hardware to accelerate a software transactional memory system. The method includes identifying a plurality of atomic operations intended to be performed by a software transactional memory system as transactional operations as part of a software transaction (act 202). The method 200 further includes selecting at least a portion of the plurality of atomic operations (act 204). The method further includes attempting to perform the portion of the plurality of atomic operations as hardware transactions using cache resident transaction hardware (act 206).

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of using cache resident transaction hardware, including specialized memory hardware that implements monitoring and buffering to support hardware based transactions, to accelerate a software transactional memory system, the method comprising:

identifying a plurality of atomic operations intended to be performed by a software transactional memory system as software based interlocked transactional operations as part of a software transaction;

selecting a batch of operations from the plurality of atomic operations; and attempting to perform the batch of a number N operations from the plurality of atomic operations as hardware transactions using specialized hardware that supports transactional memory by monitoring, wherein attempting to perform the batch of operations from the plurality of atomic operations as hardware transactions using cache resident transaction hardware comprises attempting hardware transactions where software based interlocked transaction atomic operations are replaced with at least one hardware monitored or buffered read or write.

2. The method of claim 1, wherein selecting at least a portion of the plurality of atomic operations comprises selecting a number of operations N by computing N such that $N > T/(I-M)$ where N: number of operations in a batch; I: average cost of a non-contended software based atomic operation; M: average cost of a successfully monitored and buffered operation in a cache resident transaction; T: average cost of initiating and committing a cache resident transaction.

3. The method of claim 2, wherein N is reduced exponentially over each try after a failed attempt to perform a hardware transaction.

4. The method of claim 1, wherein N is increased linearly over each try after a successful attempt to perform a hardware transaction.

5. The method of claim 1, further comprising reverting to a software transactional system to perform the portion of the plurality of atomic operations after attempting to perform the portion of the plurality of atomic operations as hardware transactions using cache resident transaction hardware due to a failure of the hardware transaction.

6. The method of claim 1, further comprising reverting to a software transactional system to perform the portion of the plurality of atomic operations after attempting a predetermined number of times to perform the portion of the plurality of atomic operations as hardware transactions using cache resident transaction hardware due to a failure of the hardware transaction a predetermined number of times.

7. The method of claim 1, wherein attempting to perform the portion of the plurality of atomic operations as hardware transactions using cache resident transaction hardware comprises attempting implicit transactions where atomic operations are replaced with implicitly monitored and buffered reads and writes.

8. The method of claim 1, wherein attempting to perform the portion of the plurality of atomic operations as hardware transactions using cache resident transaction hardware comprises attempting explicit transactions where atomic operations are replaced with explicitly monitored and buffered reads and writes.

9. The method of claim 1, wherein identifying a plurality of atomic operations intended to be performed by a software transactional memory system as transactional operations comprises identifying a log of operations for a software transactional memory transaction.

10. The method of claim 1, wherein attempting to perform the portion of the plurality of atomic operations as hardware transactions using cache resident transaction hardware comprises a compiler introducing nested cache resident transactions into generated code.

11. The method of claim 10, wherein a compiler introducing nested cache resident transactions into generated code comprises the compiler statically placing cache resident transaction boundaries into the generated code.

12. The method of claim 1, wherein attempting to perform the portion of the plurality of atomic operations as hardware transactions using cache resident transaction hardware does not include a compiler introducing nested cache resident transactions into generated code.

13. The method of claim 12, further comprising aborting a cache resident transaction, and as a result, aborting the software transaction.

14. The method of claim 1, wherein attempting to perform the portion of the plurality of atomic operations as hardware transactions using cache resident transaction hardware comprises performing the operations within the scope of an already existing cache resident transaction.

15. The method of claim 1, wherein attempting to perform the portion of the plurality of atomic operations as hardware transactions using cache resident transaction hardware comprises starting a new cache resident transaction with the purpose of performing the portion of the plurality of atomic operations as hardware transactions using cache resident transaction hardware.

16. A physical computer readable storage medium comprising computer executable instructions that when executed by one or more processors cause the one or more processors to perform the following:

identifying a plurality of atomic operations intended to be performed by a software transactional memory system as software based interlocked transactional operations as part of a software transaction;

selecting a batch of of a number N operations from the plurality of atomic operations; and attempting to perform the batch of operations from the plurality of atomic operations as hardware transactions using specialized hardware that supports transactional memory by monitoring, wherein attempting to perform the batch of operations from the plurality of atomic operations as hardware transactions using cache resident transaction hardware comprises attempting hardware transactions where software based interlocked transaction atomic operations are replaced with at least one hardware monitored or buffered read or write.

17. The physical computer readable storage medium of claim 16, wherein selecting at least a portion of the plurality of atomic operations comprises selecting a number of operations N by computing N such that $N > T/(I-M)$ where N: number of operations in a batch; I: average cost of a non-contended software based atomic operation; M:
average cost of a successfully monitored and buffered operation in a cache resident transaction;
T: average cost of initiating and committing a cache resident transaction.

18. The physical computer readable storage medium of claim 16, wherein N is reduced exponentially over each try after a failed attempt to perform a hardware transaction.

19. The physical computer readable storage medium of claim 16, wherein N is increased linearly over each try after a successful attempt to perform a hardware transaction.

20. A computer system comprising:

one or more processors;

one or more computer memory coupled to the one or more processors, the computer memory having stored thereon computer executable instructions that when executed by the one or more processors cause the one or more processors to perform the following:

identifying a plurality of atomic operations intended to be performed by a software transactional memory system as software based interlocked transactional operations as part of a software transaction;

selecting a batch of a number N operations from the plurality of atomic operations; and attempting to perform the batch of operations from the plurality of atomic operations as hardware transactions using specialized hardware that supports transactional memory by monitoring, wherein attempting to perform the batch of operations from the plurality of atomic operations as hardware transactions using cache resident transaction hardware comprises attempting hardware transactions where software based interlocked transaction atomic operations are replaced with at least one hardware monitored or buffered read or write.

* * * * *